United States Patent
Arany-Kovacs

(10) Patent No.: US 7,818,862 B2
(45) Date of Patent: Oct. 26, 2010

(54) UNITARY NUT AND WASHER AND METHOD

(75) Inventor: Steven Thomas Arany-Kovacs, Monroe, WA (US)

(73) Assignee: The Boeing Company, Chicago, IL (US)

( * ) Notice: Subject to any disclaimer, the term of this patent is extended or adjusted under 35 U.S.C. 154(b) by 880 days.

(21) Appl. No.: 11/593,979

(22) Filed: Nov. 6, 2006

(65) Prior Publication Data

US 2008/0107498 A1 May 8, 2008

(51) Int. Cl.
*B23P 19/04* (2006.01)
*F16B 43/00* (2006.01)

(52) U.S. Cl. .............. 29/402.03; 29/426.1; 29/469; 411/533; 411/337

(58) Field of Classification Search .......... 29/452, 29/526.1, 469, 402.03; 411/533, 337
See application file for complete search history.

(56) References Cited

U.S. PATENT DOCUMENTS

| | | | | |
|---|---|---|---|---|
| 2,529,343 A | * | 11/1950 | Lamb | 411/82 |
| 2,679,880 A | * | 6/1954 | Poupitch | 411/134 |
| 3,181,584 A | * | 5/1965 | Borowsky | 411/134 |
| 3,659,491 A | | 5/1972 | Duffy et al. | |
| 3,973,611 A | * | 8/1976 | Profit | 411/273 |
| 4,031,936 A | * | 6/1977 | Curtis | 411/134 |
| 4,900,209 A | * | 2/1990 | Reynolds | 411/432 |
| 5,507,517 A | * | 4/1996 | Krawczak | 411/533 |
| 6,554,552 B2 | * | 4/2003 | McKinlay | 411/149 |
| 6,976,817 B1 | * | 12/2005 | Grainger | 411/204 |
| 7,437,976 B1 | * | 10/2008 | Goldbaum | 81/121.1 |
| 2004/0175252 A1 | * | 9/2004 | Kurczynski | 411/120 |
| 2004/0234358 A1 | * | 11/2004 | Genick | 411/533 |
| 2007/0128003 A1 | * | 6/2007 | Shiu | 411/533 |

\* cited by examiner

*Primary Examiner*—Essama Omgba

(57) ABSTRACT

Embodiments of the present invention provide a unitary axle nut and tang washer assembly suitable for use in an aircraft landing gear wheel and brake structure. The assembly includes an axle nut in communication with a tang washer having a retainer wire groove formed therebetween; and a retainer wire held in the retainer wire groove.

10 Claims, 8 Drawing Sheets

UNITARY NUT AND WASHER AND METHOD

TECHNICAL FIELD

Embodiments of the present invention relate to the field of fasteners, more specifically, to a nut and washer assembly adapted to be unitary arrangement.

BACKGROUND

In certain applications, for example, aircraft landing gear, the main landing gear (MLG) and the nose landing gear (NLG) wheel and brake assembly is retained by an axle nut and a tang washer. Two cross bolts secure the axle nut to the axle after the required assembly torque is applied preventing the axle nut from coming loose. During MLG and NLG wheel and brake servicing, the tang washer is at risk of being omitted at reassembly. When omitted, the assembly can be loose, and can lack the proper bearing preload and can cause substantial damage to the wheel and brake assembly. In the worst case the wheel can separate from the airplane.

Some aircraft manufacturers have elected to simply use an axle nut, without a tang washer. However, this design solution has the following problems: Without the tang washer, the cross bolts that secure the axle nut after the proper preload torque has been applied are exposed to wheel bearing induced torque load. Cross bolts have been sheared in service, causing substantial damage and/or wheel departure.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, a phrase in the form "A/B" means A or B. For the purposes of the present invention, a phrase in the form "A and/or B" means "(A), (B), or (A and B)." For the purposes of the present invention, a phrase in the form "at least one of A, B, and C" means "(A), (B), (C), (A and B), (A and C), (B and C), or (A, B and C)." For the purposes of the present invention, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention may provide a nut and washer assembly held together as a unit with a wire disposed within a groove common to both. The wire may be fed into the groove through a slot in one or both of the nut or washer. The pieces may rotate freely relative to one another.

In various embodiments, the washer may have a hole in it to receive an end of the wire. The slot may provide access to the hole, and the groove. To assemble the pair, a user, such as a maintenance technician may bend the wire, pass the bent end through the slot, and insert it into the hole. Then the user may twist one or both pieces relative one another and pull the wire through the slot into the groove. The bend in the wire may serve to hold the wire in the hole. In various embodiments the user may simply pass the wire into the groove.

Figure 1:
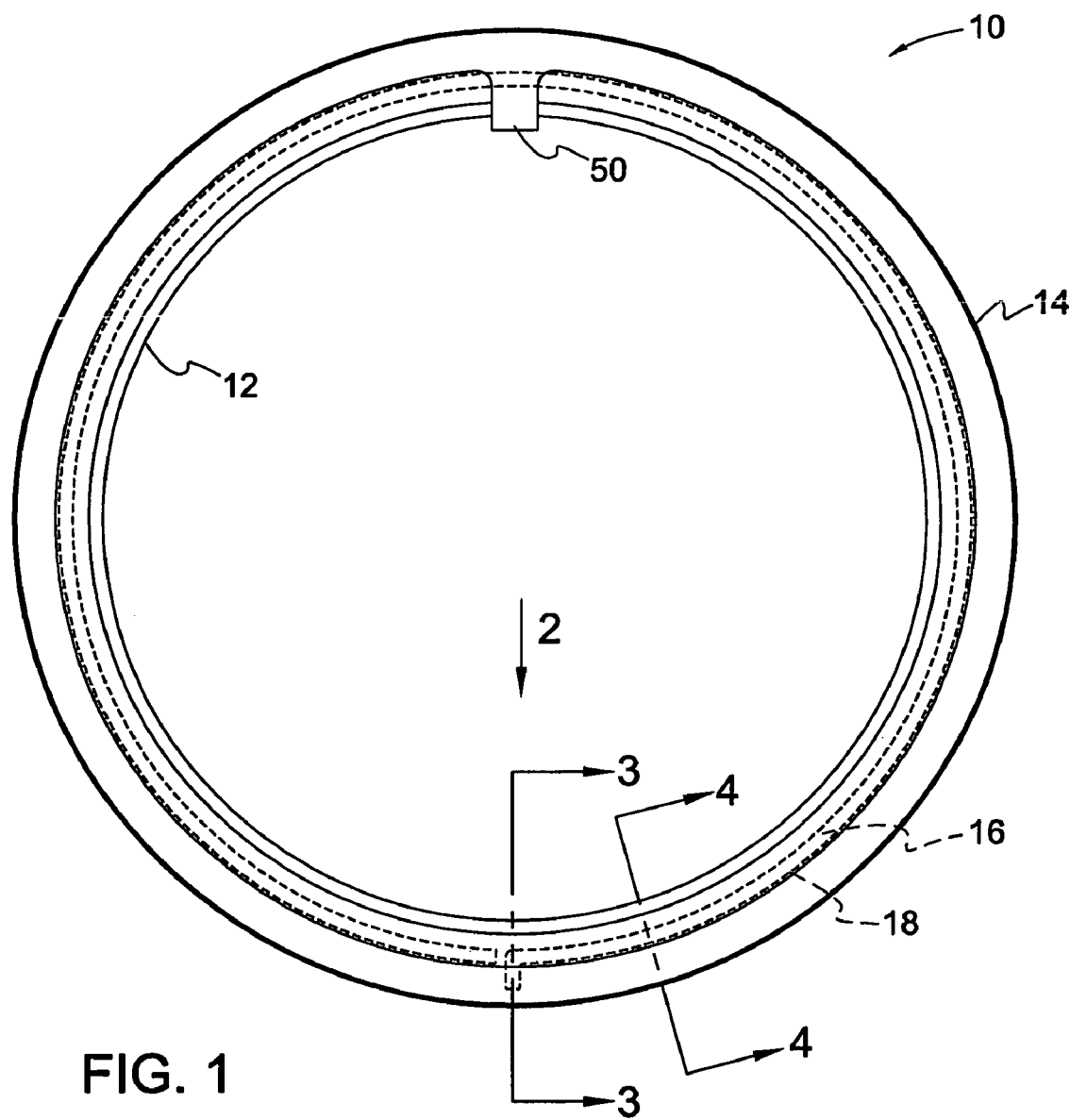
FIG. 1 illustrates a front view of a unitary nut and washer assembly in accordance with various embodiments of the present invention.

FIG. 1 illustrates a front view in accordance with various embodiments of the present invention. A unitary axle nut and tang washer assembly 10 may be used in various applications. For example, it may be used in an aircraft landing gear wheel and brake structure. The assembly may include an axle nut 12 in communication with a tang washer 14. A retainer wire groove 18 may be formed therebetween. A retainer wire 16 may be held in the retainer wire groove 18. The assembled axle nut 12 and tang washer 14 may form a unitary assembly capable of free axial rotation, relative to said each other.

Figure 2:
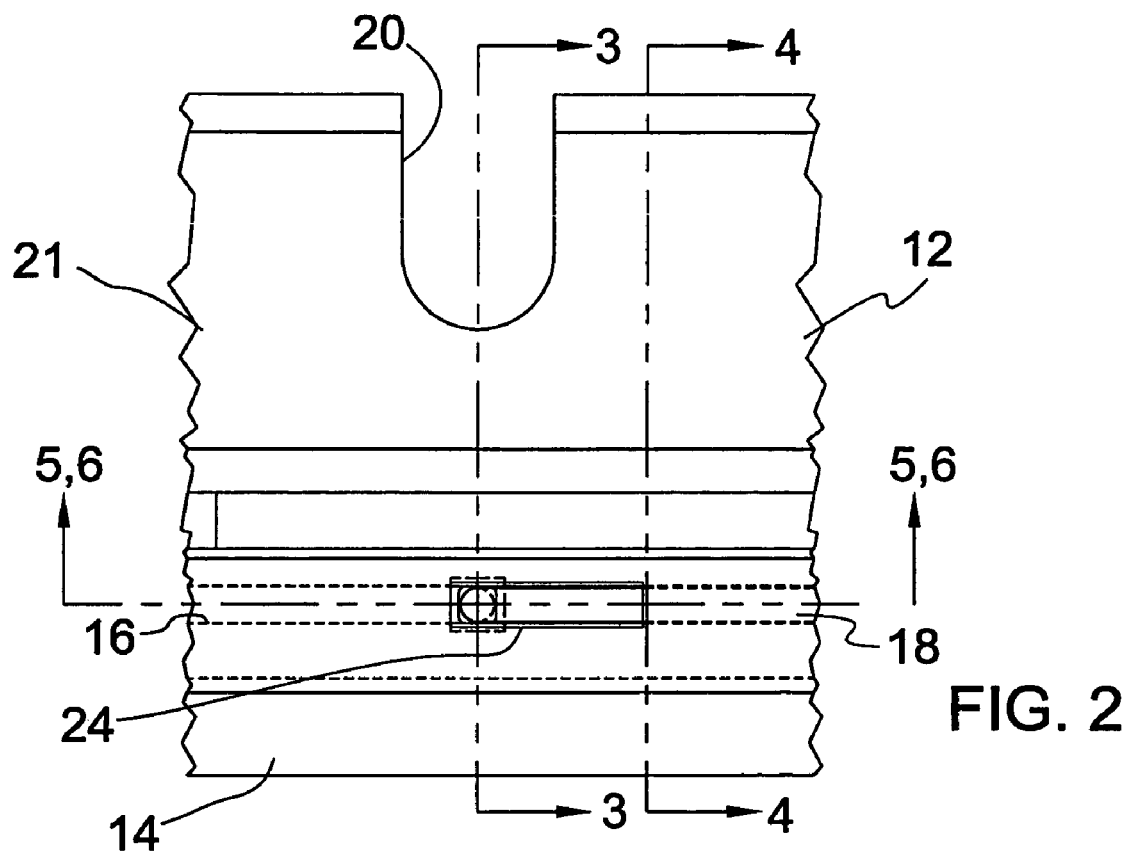
FIG. 2 illustrates a break away portion of the nut and washer assembly illustrated in FIG. 1 taken from the direction illustrated with arrow 2.

FIG. 2 is a cutaway view taken from a direction shown by arrow 2 in FIG. 1. Openings 20 may be included in a flange 21 of the axle nut 12. The openings 20 may be adapted to receive cross bolts (not shown) adapted to secure the axle nut 12 to an axle, for example, the axle of an aircraft landing gear (not shown). Various embodiments may use other types of nuts and washers.

Figure 3:
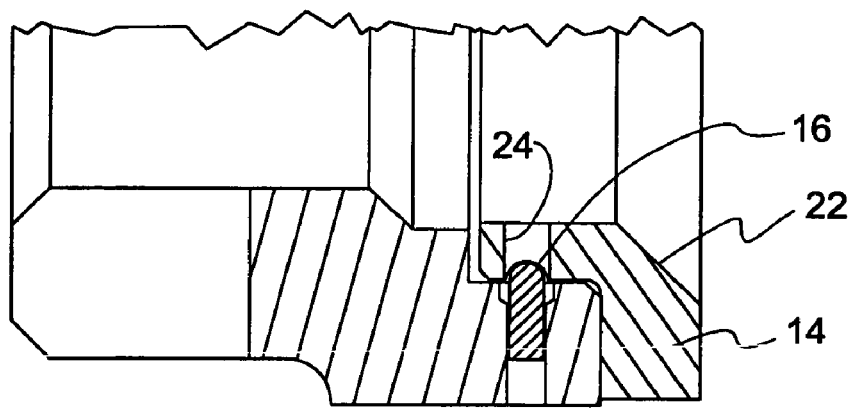
FIG. 3 illustrates a cross-sectional view according to various embodiments of the invention taken at the line 3-3 of FIGS. 1 and 2.
Figure 4:
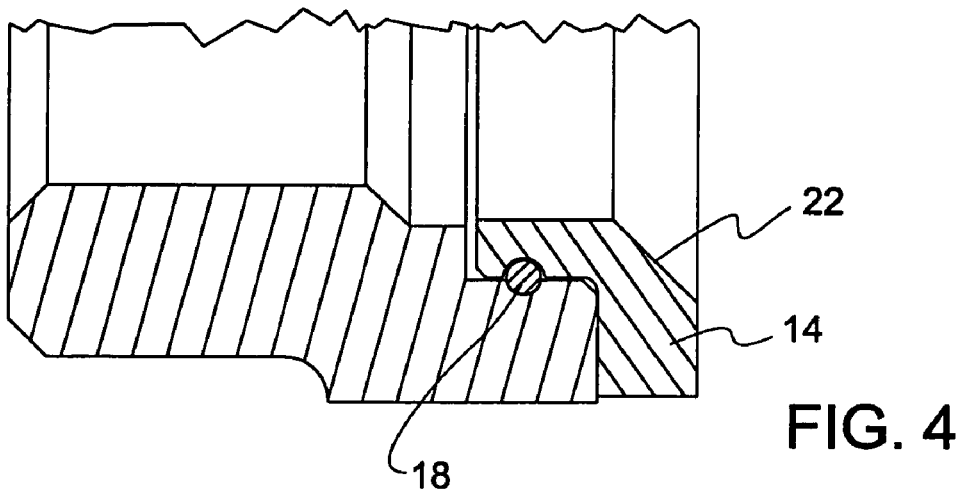
FIG. 4 illustrates a cross-sectional view according to various embodiments of the invention taken at the line 4-4 of FIGS. 1 and 2.

FIG. 3 is a cross-sectional view taken at the line 3-3 in FIGS. 1 and 2, and FIG. 4 is a cross-sectional view taken at the line 4-4 in FIGS. 1 and 2. As shown for the embodiments the tang washer 14 may have at least one chamfered external surface 22. In various embodiments one or more surfaces may be chamfered for various reasons including to save weight. Various other geometries may be used with various other embodiments while still providing sufficient strength and function in accordance with the invention.

Figure 5:
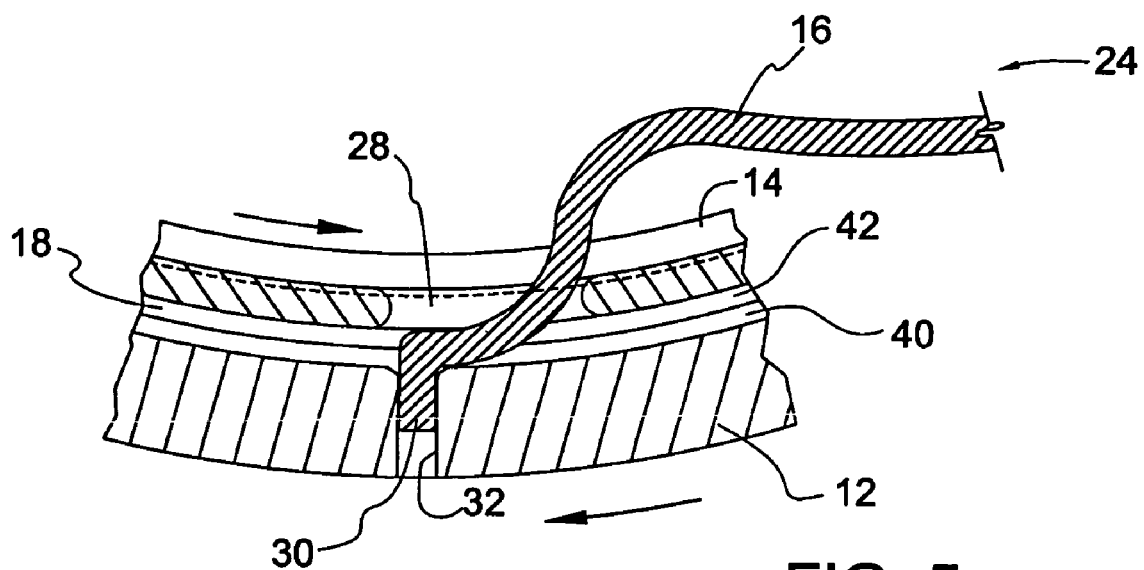
FIG. 5 illustrates a cross-sectional view according to various embodiments of the invention taken at the line 5-5 of FIG. 2 showing a wire 16 in a first position.
Figure 6:
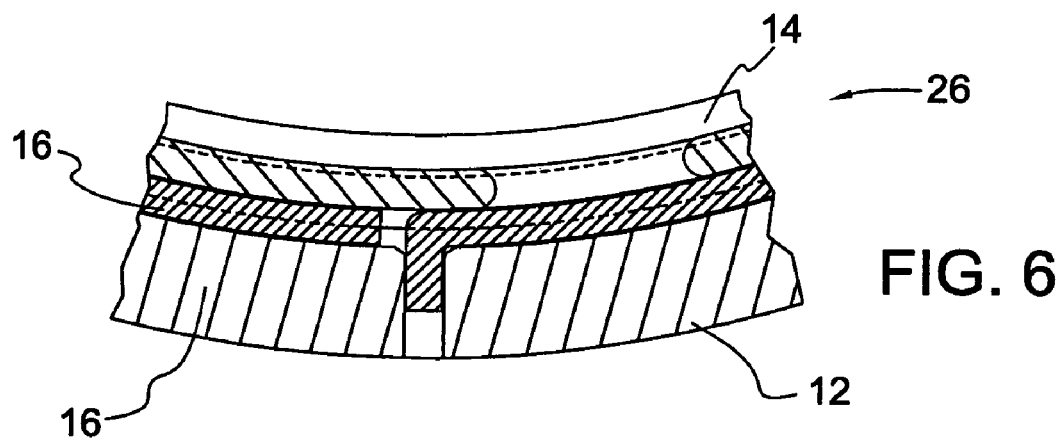
FIG. 6 illustrates a cross-sectional view similar to FIG. 5 showing the wire 16 in a second position of the invention taken at the line 6-6 of FIG. 2.

FIGS. 5 and 6 illustrate cross-sectional views taken at the line 5,6-5,6 of FIG. 2 illustrating the retainer wire 16 in a respective first position 24 (FIG. 5) and a second position 26 (FIG. 6). The tang washer 14 may have a slot 28 in communication with the retainer wire groove 18. The slot 28 may be adapted to receive an end 30 of the retainer wire 16 and to enable the retainer wire to be passed into the retainer wire groove 18 via the slot 28.

In various embodiments the axle nut 12 may include a hole 32. The hole may be adapted to hold the retainer wire 16, for example, at the end 30 while the axle nut 12 and the tang washer 14 are rotated relative each other to pull the retainer wire 16 through the slot 28 into the retainer wire groove 18. Other embodiments may include different arrangements to hold the wire or other objects in order to pull them into the groove. Various embodiments may allow one or more objects to move within the groove.

Figure 7:
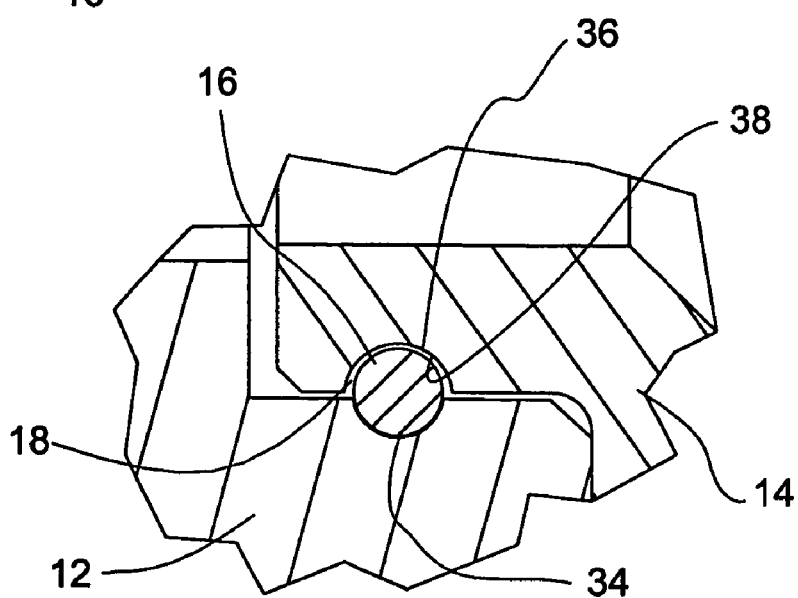
FIG. 7 illustrates a detailed partial cross-sectional view similar to the cross sectional view illustrated in FIG. 4.

FIG. 7 is a detailed partial cross-sectional view illustrating various embodiments in accordance with the invention. The retainer wire groove 18 may have a first side 34 formed in, for example, the axle nut 12 and a second side 36 formed in the tang washer 14, the second side 36 may be sized, i.e., sufficiently larger than the wire, to provide sufficient clearance between an inner surface 38 of the retainer wire groove 18 and the retainer wire 16 to substantially prevent clamping across the retainer wire 16.

In various embodiments the axle nut 12, the tang washer 14, and the retainer wire 16 may be made from steel. Various other embodiments may use other materials. Using similar materials for all three components may reduce or prevent corrosion. In various embodiments the wire may be made from or coated with a material to prevent corrosion and/or provide lubrication between the parts that may move relative one another. For example, various embodiments may utilize one or more materials such as Teflon®.

Referring again to FIGS. 5 and 6 various embodiments may include an apparatus including a nut 12 having a first groove portion 40 and a washer 14 having a second groove portion 42 adapted to be disposed adjacent the nut 12 such that the first groove portion 40 and the second groove portion 42 form a unitary groove 18. One or more objects may be disposed in the unitary groove 18 and may be adapted to span at least partway between the first groove portion 40 and the second groove portion 42. The one or more objects may prevent relative axial movement of the nut 12 and the washer 14 but may permit relative rotational movement therebetween.

The one or more objects may be selected from the group consisting of a wire 16 as illustrated in FIGS. 1-7, two or more pins (discussed herein), and two or more screws (discussed herein).

Referring again to FIG. 1, various embodiments may include a washer 14 having the tang 50 may be adapted to couple with a mating slot in, for example, a landing gear assembly to prevent the washer from rotating.

Figure 8:
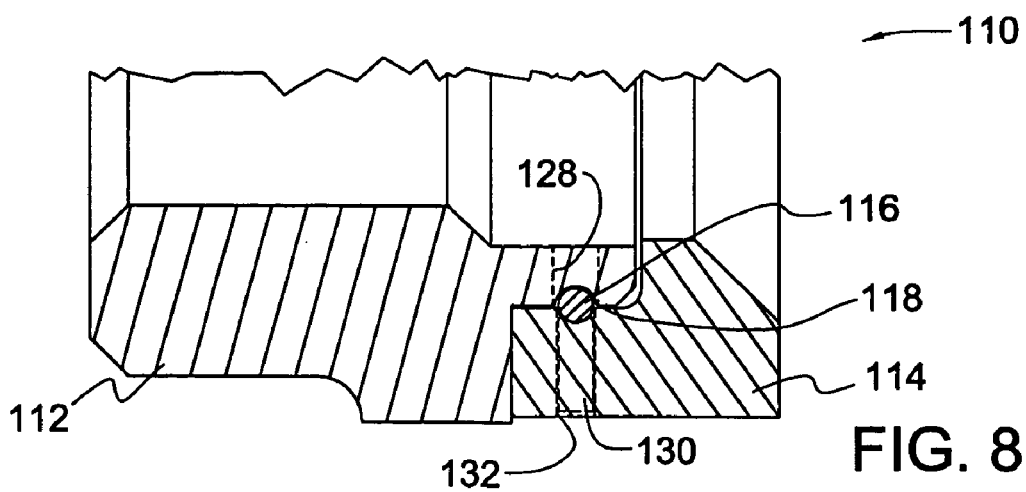
FIG. 8 illustrates a cross-sectional view in accordance with various embodiments of the present invention.

FIG. 8 illustrates a cross-sectional view in accordance with various embodiments of the invention. An apparatus 110 is illustrated wherein one or more objects such as a wire 116 is disposed in a unitary groove 118 between a nut 112 and a washer 114. The nut may include a slot 128 disposed to pass the wire through and into the groove 118. The other of the nut and the washer, for the example embodiment the washer, may include a hole 132 adapted to receive an end 130 of the wire 116. The hole 132 may be further adapted to hold the end 130 while the nut and the washer are rotated relative to each other to pull the wire through the slot 128 and into the unity groove 118.

Various embodiments may include various interpositional relationships of the nut and washer and various placements of a slot to access the groove and a hole to hold an object such as a wire in place. Various embodiments may not include a hole or other means to hold the wire or other object in place. The washer may have an inside surface and the slot may be in the washer and may be open to inside surface. In various embodiments the hole may be a through hole in the nut.

Figure 9:
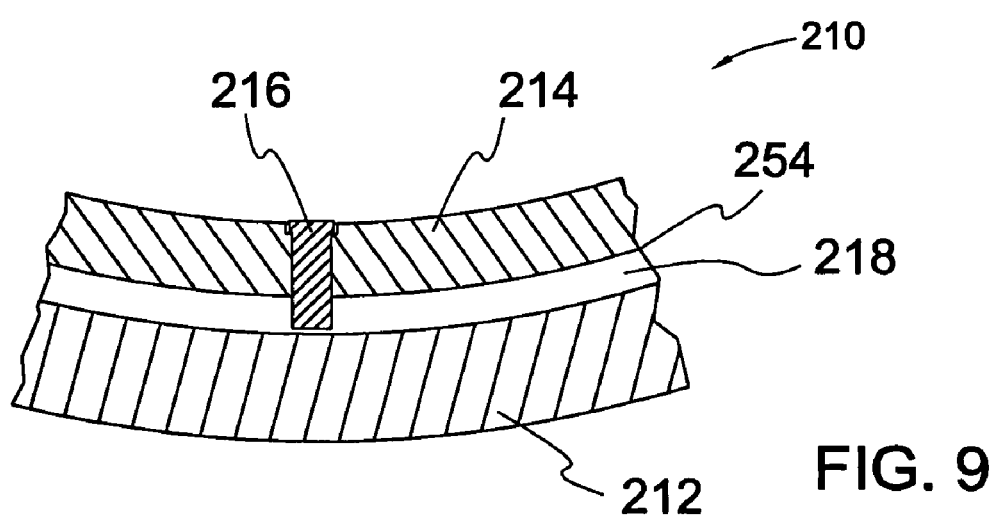
FIG. 9 illustrates a cross-sectional view in accordance with various embodiments of the present invention.

FIG. 9 is a cross-sectional view illustrating various embodiments in accordance with the invention. An apparatus 210 may comprise a nut 212, a washer 214 and a groove 218 formed in at least one of the nut 212 and the washer 214. The groove 218 may be formed completely in either the nut 212 or the washer 214. One such example is illustrated in FIG. 9 wherein a junction 254 between the nut 212 and the washer 214 is concurrent with one edge of the washer 214. In various other embodiments the junction line may be various distances from the edge of the nut including concurrent with an edge of the washer 214. One or more objects 216 may be disposed in the groove 218 and may be adapted to be fixed to at least the other of the nut 212 and the washer 214 containing the groove. For example, as shown the object 216 may be fixed to the washer 214 and the groove 218 may be in the nut 212. The one or more objects may be selected from the group consisting of a wire, two or more pins, and two or more screws.

Figure 10:
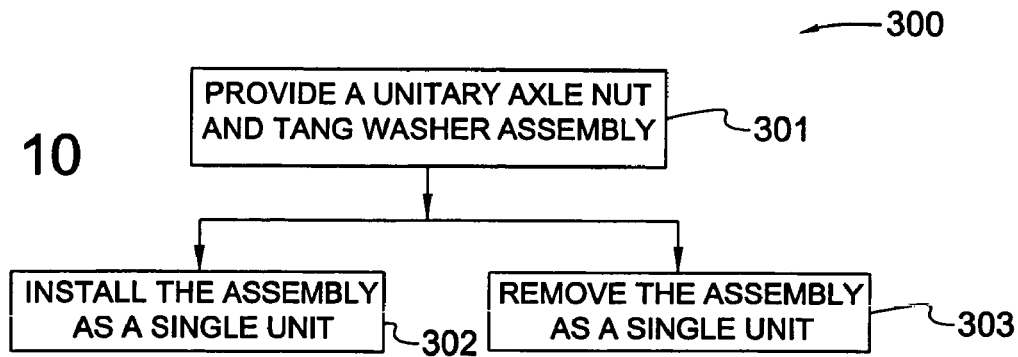
FIGS. 10-20 are flow diagrams illustrating various methods in accordance with various embodiments of the invention.

FIG. 10 is a flow diagram illustrating a method 300 in accordance with the various embodiments of the invention. The method 300 may be for improving in-service aircraft landing gear maintenance and may include:
    providing a unitary axle nut and tang washer assembly, 301 and one of installing 302 or removing 303 the assembly as a single unit.

Figure 11:
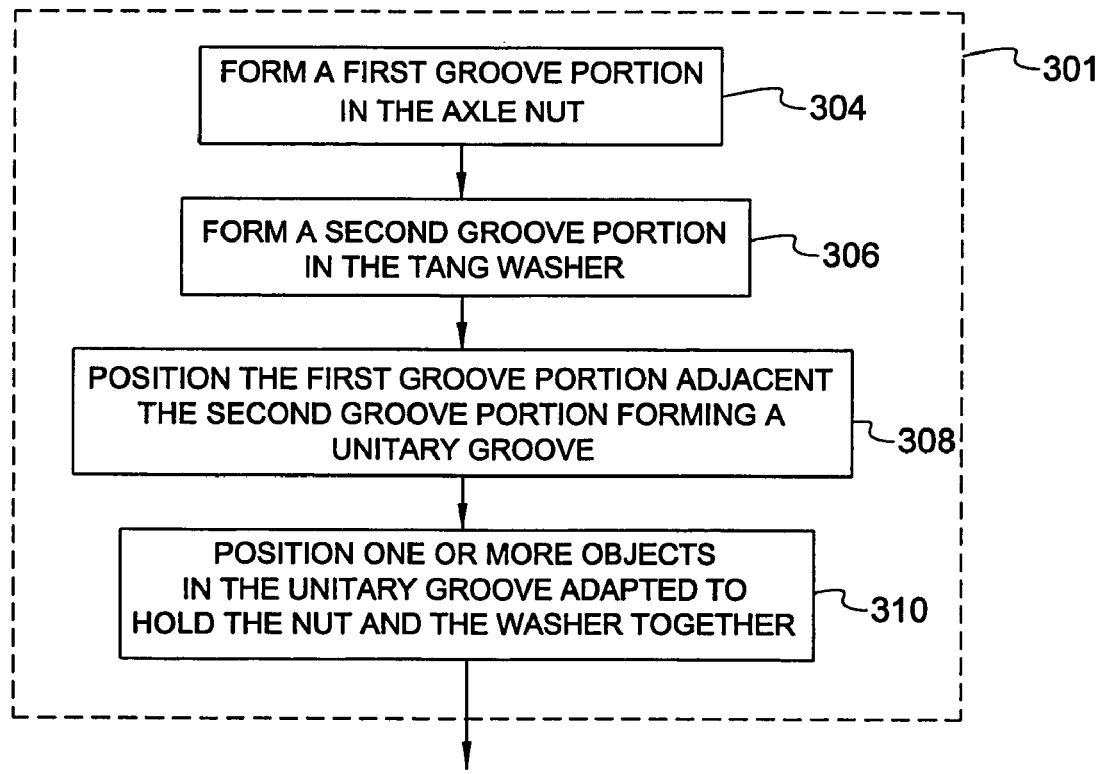

FIG. 11 is a flow diagram illustrating a method in accordance with various embodiments of the invention. The providing a unitary axle nut and tang washer assembly 301 may include:
    forming a first groove portion in the axle nut, 304;
    forming a second groove portion in the tang washer, 306;
    positioning the first groove portion adjacent the second groove portion forming an unitary groove 308; and
    positioning one or more objects in the unitary groove adapted to hold the axle nut and the tang washer together, 310.

The one or more objects may be a wire.

Figure 12:
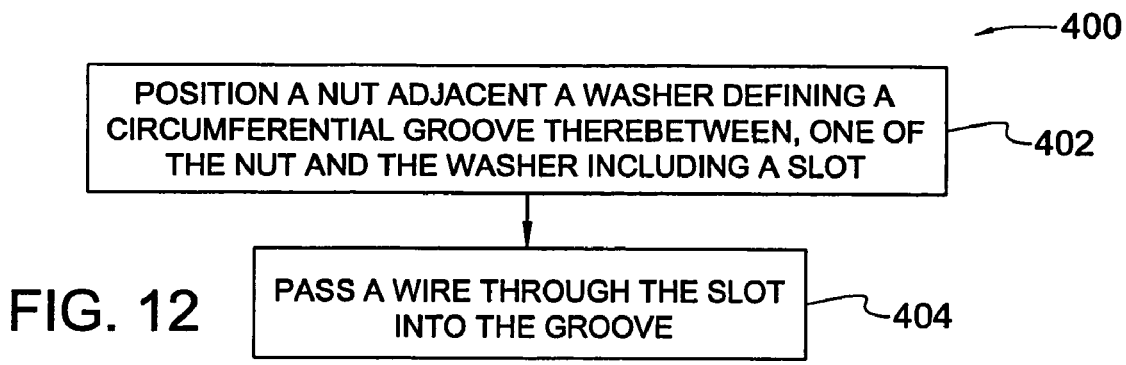

FIG. 12 is a flow diagram illustrating a method 400 in accordance with various embodiments of the invention. The method may include:
    positioning a nut adjacent a washer defining a circumferential groove therebetween, one of the nut and the washer including a slot, 402 and
    passing a wire through the slot into the groove, 404.

Figure 13:
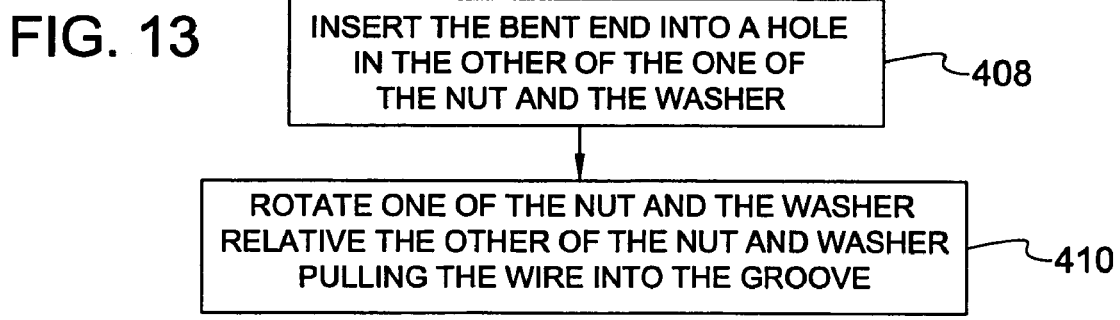

FIG. 13 is a flow diagram of a method illustrating various other embodiments wherein the method illustrated in FIG. 12 may include:
    bending a first end of the wire forming a bent end, 406;

inserting the bent end into a hole in the other of the one of the nut and the washer 408; and rotating one of the nut and the washer relative the other of the nut and washer pulling the wire into the groove, 410.

Figure 14:
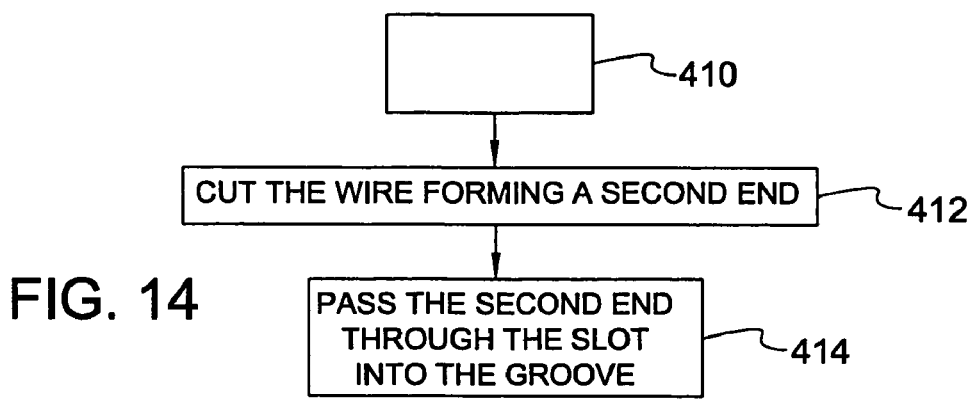

FIG. 14 is a flow diagram of a method illustrating various other embodiments wherein the method illustrated in FIG. 12 may include:

cutting the wire forming a second end, 412, and passing the second end through the slot into the groove, 414.

Figure 15:
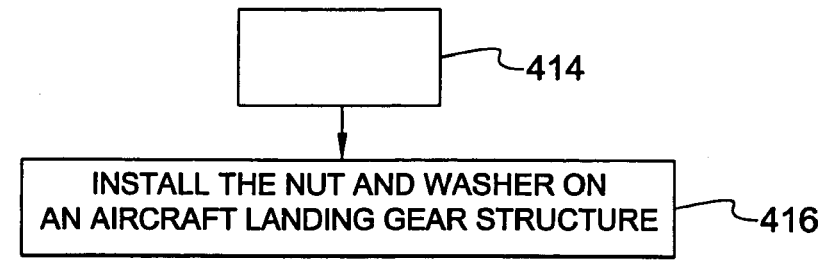

FIG. 15 is a flow diagram of a method illustrating various other embodiments wherein the method illustrated in FIG. 12 may include:

installing the nut and washer on an aircraft landing gear structure, 416.

Figure 16:
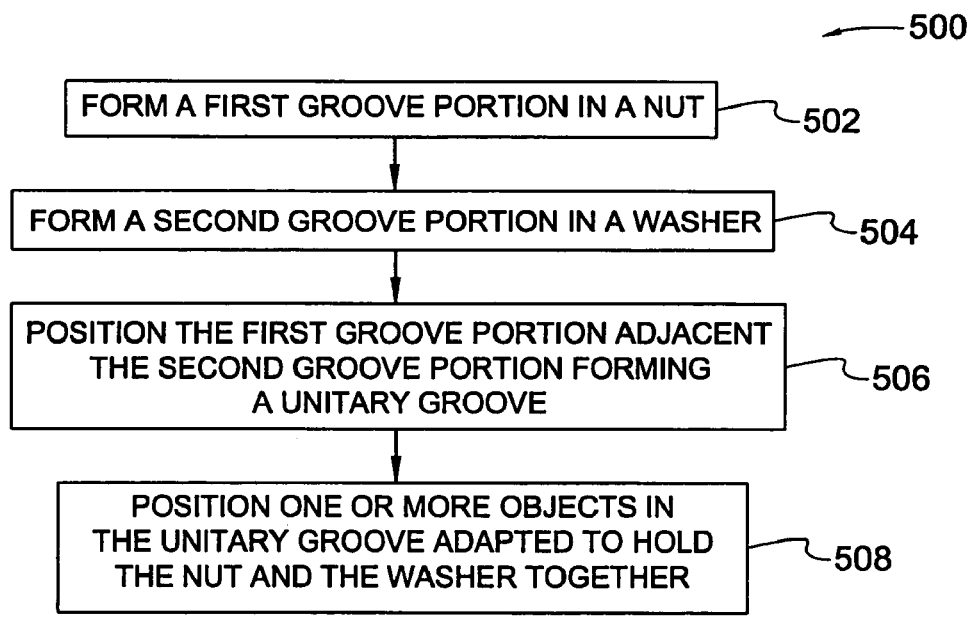

FIG. 16 is a flow diagram illustrating a method 500 in accordance with various embodiments of the invention. The method may include:

forming a first groove portion in a nut, 502;

forming a second groove portion in a washer, 504;

positioning the first groove portion adjacent the second groove portion forming an unitary groove, 506;

positioning one or more objects in the unitary groove adapted to hold the nut and the washer together, 508.

Figure 17:
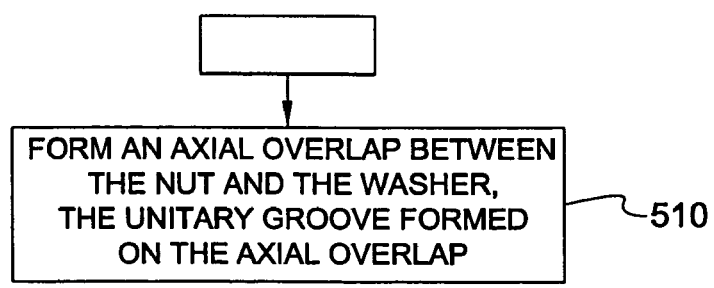

As illustrated in the flow diagram of FIG. 17, in various embodiments one or more of the methods illustrated may include forming an axial overlap between the nut and the washer, the unitary groove formed on the axial overlap, 510.

One or more objects are selected from the group consisting of a wire, two or more pins, and two or more screws.

Figure 18:
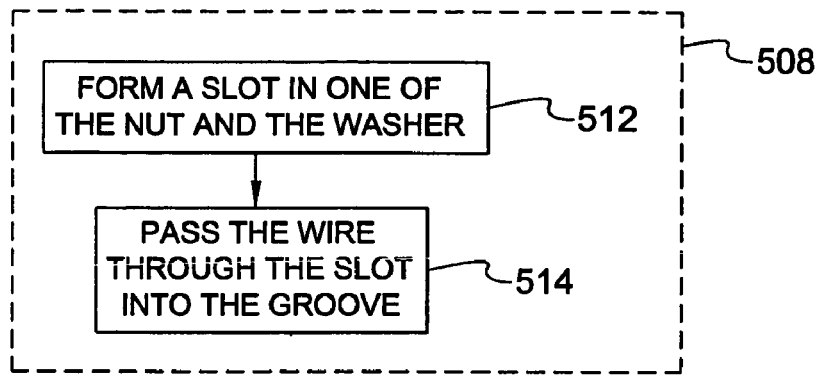

As illustrated in the flow diagram of FIG. 18, various embodiments may also include forming a slot in one of the nut and the washer, 512 and passing the wire through the slot into the groove, 514.

Figure 19:
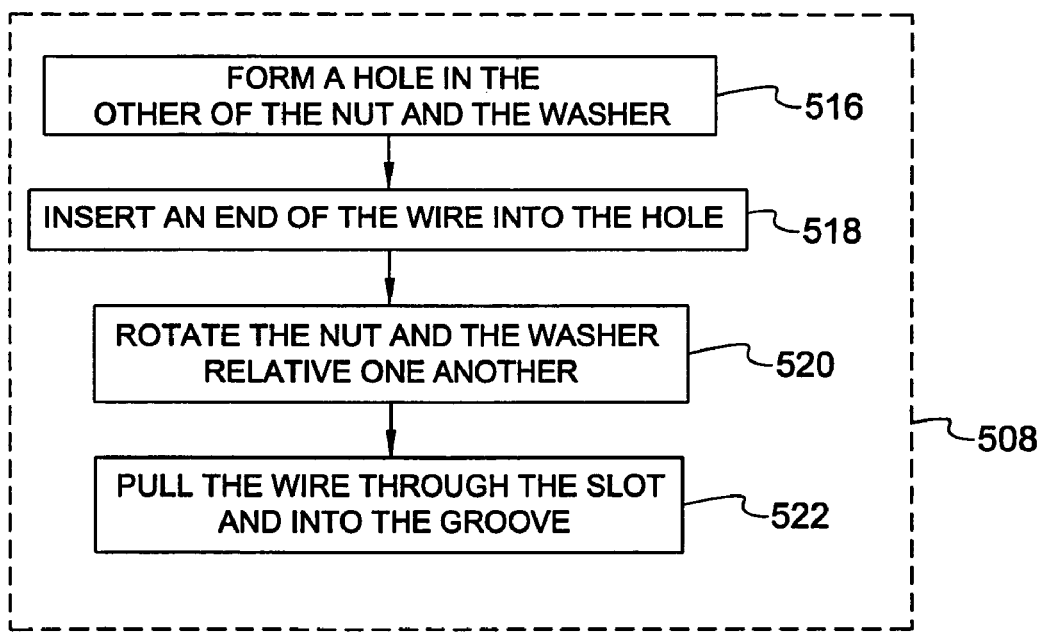

FIG. 19 is a flow diagram illustrating a method in accordance with various embodiments of the invention. The method may include:

forming a hole in the other of the nut and the washer, 516;

inserting an end of the wire into the hole, 518;

rotating the nut and the washer relative one another, 520; and pulling the wire through the slot and into the groove, 522.

Figure 20:
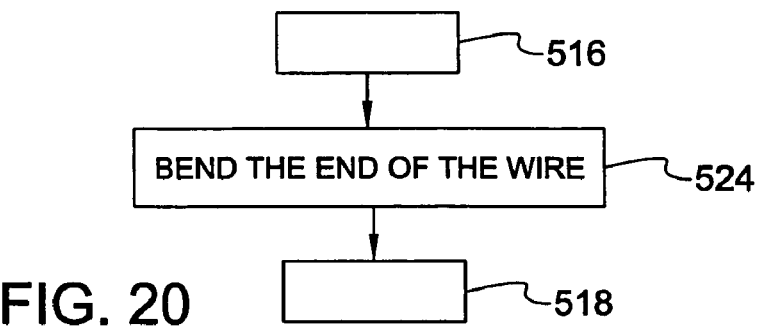

FIG. 20 is a flow diagram of a method illustrating various other embodiments wherein the method illustrated in FIG. 19 may include:

bending the end of the wire prior to inserting it into the hole prior to the inserting an end, 524.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for improving in-service aircraft landing gear maintenance comprising the steps of:

providing a nut and a washer;

forming an axial overlap between the nut and washer;

forming a first groove portion in the nut;

forming a second groove portion in the washer;

positioning the first groove portion adjacent the second groove portion to form a unitary groove enclosed by the axial overlap;

positioning one or more objects in the groove to hold the nut and the washer together and permit relative rotational movement thereof; and installing or removing the nut and washer as a single unit.

2. The method of claim 1, further comprising the steps of:

preventing axial motion of the nut relative to the washer; and permitting rotational motion of the nut relative to the washer.

3. The method of claim 1, wherein the one or more objects are selected from the group comprising:

a wire;

two or more pins; and two or more screws.

4. The method of claim 3, further comprising the steps of:

forming a slot in at least one of the nut and washer; and feeding the wire into the groove through the slot.

5. The method of claim 4, further comprising the steps of:

cutting the wire to form a second end; and passing the second end through the slot and into the groove.

6. The method of claim 1, further comprising the step of:

fixing the one or more of the objects to one of the nut and washer such that the one or more of the objects extend into the groove.

7. A method for improving in-service aircraft landing gear maintenance comprising the steps of:

providing an axle nut and tang washer;

forming a groove in at least one of the axle nut and tang washer;

forming a hole in at least one of the axle nut and tang washer;

forming a slot in at least one of the axle nut and tang washer;

feeding a wire into the groove through the slot;

inserting an end of the wire into the hole;

rotating the axle nut relative to the tang washer;

pulling the wire through the slot and into the groove; and installing or removing the axle nut and tang washer as a single unit.

8. A method for improving in-service aircraft landing gear maintenance comprising the steps of:

providing an axle nut and tang washer;

forming a groove in at least one of the axle nut and tang washer;

positioning a wire in the groove to hold the axle nut and tang washer together;

bending a first end of the wire forming a bent end;

inserting the bent end into a hole formed in one of the axle nut and tang washer;

rotating the axle nut relative to the tang washer to pull the wire into the groove; and installing or removing the axle nut and tang washer as a single unit.

9. A method for installing a nut and washer on an axle of an aircraft landing gear, the method comprising the steps of:

providing an axle nut and tang washer assembly;

forming an axial overlap between the axle nut and the tang washer;

positioning an object in a groove enclosed by the axial overlap between the axle nut and tang washer to prevent axial motion of the axle nut relative to the tang washer and permit relative rotational motion thereof; and performing at least one of the following:

installing the assembly as a single unit on the axle;
removing the assembly as a single unit from the axle.

10. The method of claim 9, wherein the axle nut includes at least one opening, the method further comprising the steps of: installing a cross bolt in the opening to secure the axle nut to the axle after installing the assembly on the axle.

* * * * *